United States Patent [19]

Judet

[11] 4,306,811
[45] Dec. 22, 1981

[54] DEVICE FOR CONTACTLESS MEASUREMENT OF DIMENSIONS

[75] Inventor: Henri Judet, Paris, France

[73] Assignee: Societe d'Applications Generales d'Electricite et de Mecanique SAGEM, Paris, France

[21] Appl. No.: 55,799

[22] Filed: Jul. 6, 1979

[30] Foreign Application Priority Data

Jul. 7, 1978 [FR] France ............... 78 20370

[51] Int. Cl.$^3$ ............... G01B 11/00; G01B 11/02; G01B 11/12

[52] U.S. Cl. ............... 356/372; 356/381; 356/387

[58] Field of Search ............... 356/372, 384–387, 356/241, 381; 250/560; 33/141 G

[56] References Cited

U.S. PATENT DOCUMENTS

| | | | |
|---|---|---|---|
| 3,362,284 | 1/1968 | Patrignani | 250/560 |
| 3,555,288 | 1/1971 | Morenius | 250/236 |
| 3,600,815 | 8/1971 | Link | 3/185 R |
| 3,712,741 | 1/1973 | Revert | 356/387 |
| 3,778,167 | 12/1973 | Claret et al. | 356/398 |
| 4,021,119 | 3/1977 | Stauffer | 250/560 |

FOREIGN PATENT DOCUMENTS

| | | | |
|---|---|---|---|
| 722589 | 3/1932 | France. | |
| 1041127 | 9/1966 | United Kingdom. | |
| 395707 | 1/1974 | U.S.S.R. | 356/381 |

Primary Examiner—William H. Punter
Attorney, Agent, or Firm—Finnegan, Henderson, Farabow, Garrett & Dunner

[57] ABSTRACT

An apparatus for measuring a dimension of a workpiece, for instance a workpiece being machined on a lathe, comprises a unit which may be moved toward and away from the workpiece. That unit includes a forked carriage one of the prongs of the fork having a light source which directs a parallel light beam perpendicularly to the direction of movement of the carriage toward the other prong. Light sensitive means on the other prong deliver a first signal when the light beam is interrupted by the workpiece upon movement of the unit and a second signal when the light beam is re-established.

10 Claims, 5 Drawing Figures

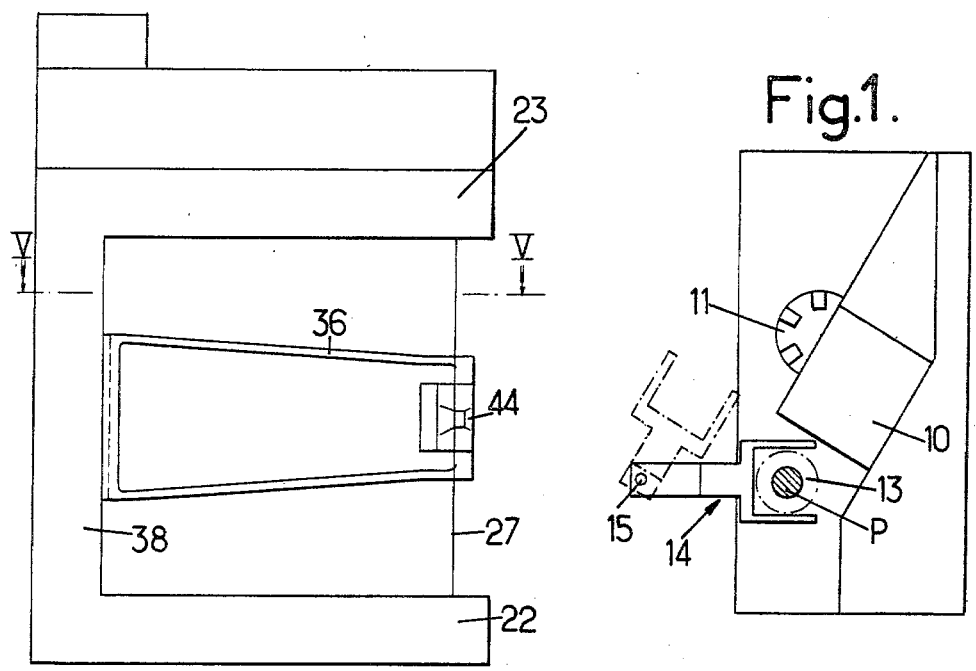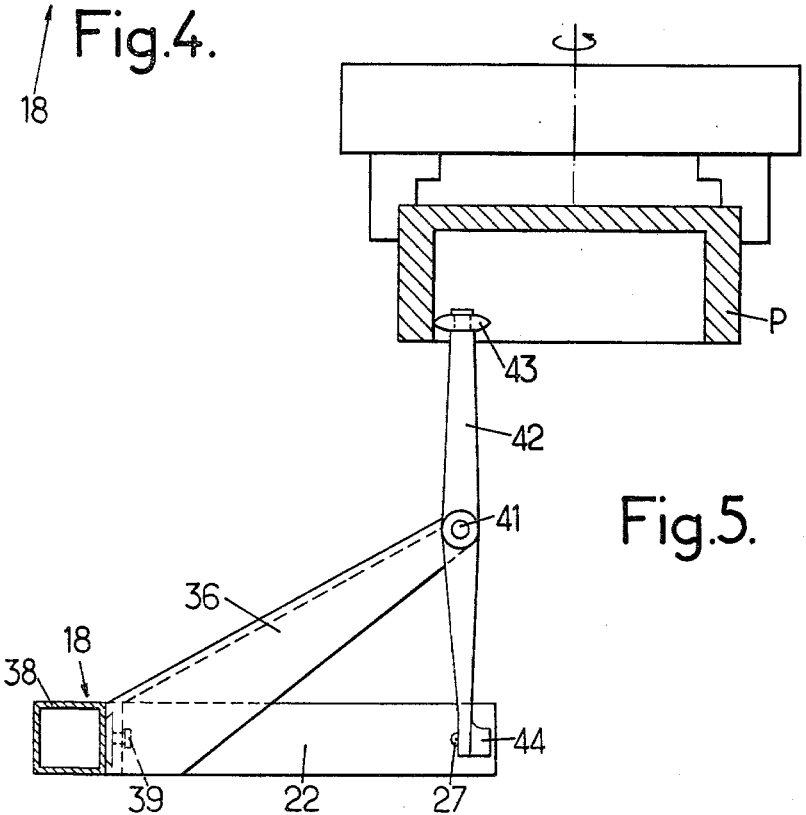

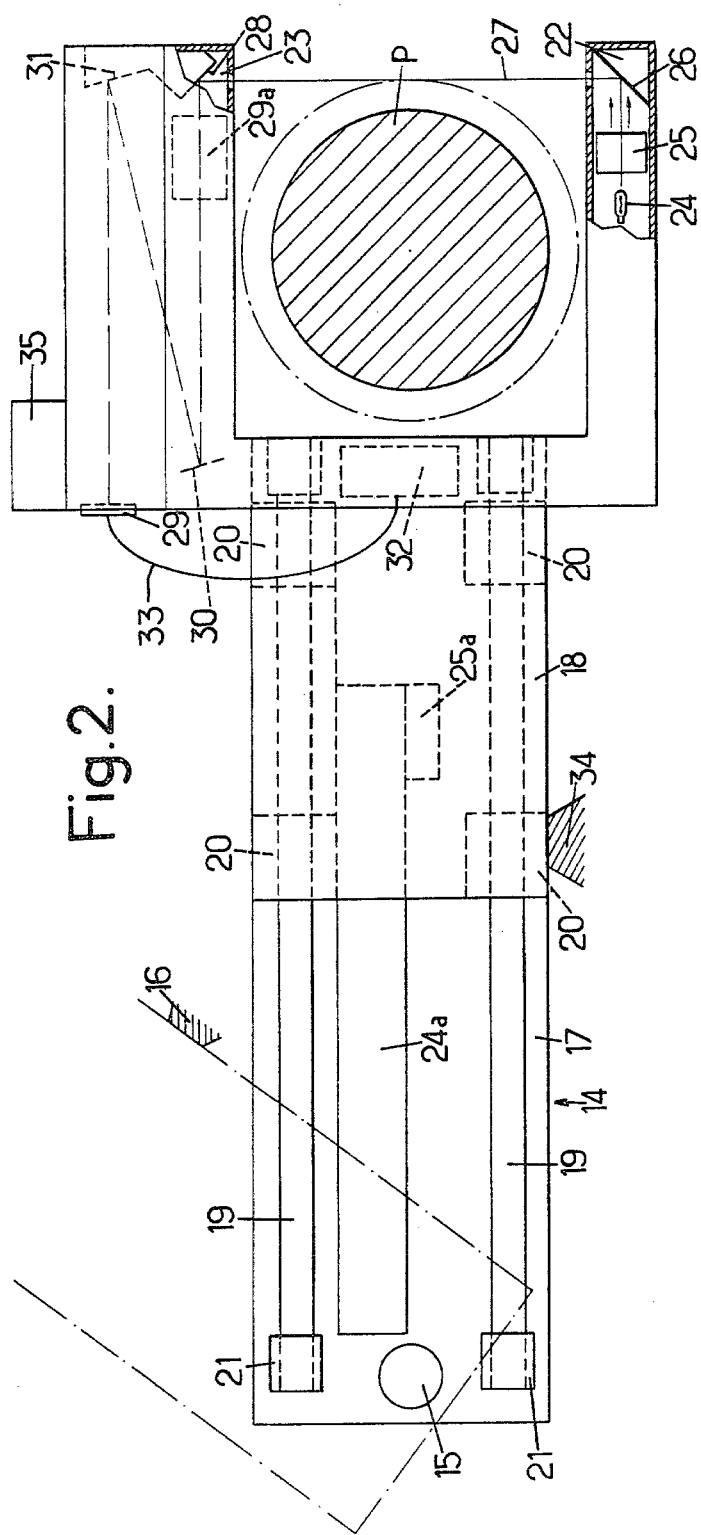
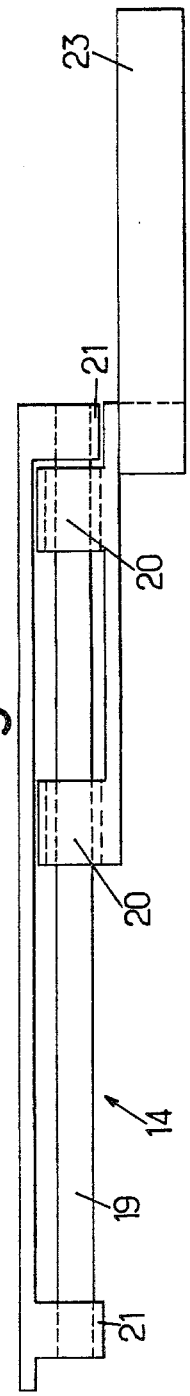

DEVICE FOR CONTACTLESS MEASUREMENT OF DIMENSIONS

BACKGROUND OF THE INVENTION

The present invention relates to a device for measuring a dimension of a body and it is particularly, but not exclusively, suitable for use in measuring a dimension of a workpiece placed on a machine tool such as a lathe.

Most prior art devices for measuring the diameter of a workpiece placed on a lathe comprise one or more mechanical sensors which are brought into contact with the surface of the workpiece. Such devices have numerous limitations in use, e.g., they fail to consistently achieve a degree of accuracy and they require a comparison with a standard.

SUMMARY OF THE INVENTION

It is an object of the invention to provide a device which is simple in design, accurate and adapted to automatic measurement processes.

A workpiece measuring device according to an aspect of the invention comprises a support for the workpiece and a unit mounted for movement in relation to the support toward and away from the workpiece. Means are provided for measuring the amounts of movement of the unit in relation to the support. The unit comprises a carriage, a terminal portion of which is formed with a fork arranged for straddling the workpiece. One of the arms of the fork has means for creating a narrow parallel light beam, perpendicular to the direction of movement of the unit and directed towards the other arm. The other arm carries photosensitive means for delivering a signal in response to the beginning and the end of occultation of the light beam by the workpiece.

The photoreceiving means typically comprise a screen coupled by optical fibers to a photosensor, such as a photomultiplier.

SHORT DESCRIPTION OF THE DRAWINGS

The invention will be better understood from the following description of a measuring device which forms one particular embodiment thereof, given by way of non-limiting example. The description refers to the accompanying drawings in which:

FIG. 1 is a simplified diagram showing the device mounted on a lathe having a sloping bed;

FIG. 2 is an elevational view on an enlarged scale showing the main mechanical components of the measuring device;

FIG. 3 is a fragmentary top view of the device of FIG. 2;

FIGS. 4 and 5 are detailed views, respectively in elevation and from above, showing an adaptor placed on the terminal portion of the device of FIG. 2 for the measurement of inner diameters.

DETAILED DESCRIPTION OF PREFERRED EMBODIMENTS

Various embodiments of the optical measuring device of the invention may be designed. Referring to FIG. 1, there is shown an embodiment designed for measuring workpieces being machined on a horizontal lathe with sloping bed. Such a lathe comprises a bed 10 sloping with respect to the vertical, possibly provided with a turret head 11 for tools. As shown, the workpiece P being machined, placed between horizontal centers, is fully seen by the operator since there is no part between it and the operator's eyes. The high temperature shavings do not fall on the bed and cannot overheat and deform it.

With this arrangement, the measuring device 14, shown in continuous line in the position when in use and in broken line in the position when at rest, can be easily located.

The device forms a unit movable along a rod 15 (FIGS. 1 and 2) also forming a pivoting axis. The rod is carried by the frame of the lathe and it is parallel to the axis of the headstock 13. Its length is sufficient for the operator to be able to push the device along the rod so as to free the workpiece except during measurements. A stop 16 may then be provided for receiving the device (FIG. 2).

Device 14 may be regarded as comprising a fixed carriage 17 and a mobile carriage 18. The fixed carriage 17 is mounted on rod 15 so as to be able to slide and rotate about this rod. It is in the form of a rigid vertical plate, provided with two longitudinal slides 19 widely spaced apart in the vertical plane. Mobile carriage 18 supports four bearings 20 imprisoning the slides 19 and allowing carriage 18 to move on the fixed carriage from a retracted position to a position of maximum advance (in which it is shown by a continuous line in FIGS. 2 and 3). The endmost positions of the mobile carriage are determined by abutment of bearings 20 against bosses 21 supporting slides 19.

A linear movement measuring system is placed between the fixed carriage 17 and the mobile carriage 18. In the embodiment illustrated, this measuring device comprises a graduated rule 24a of high accuracy supported by the fixed carriage 17 and a sensor 25a supported by mobile carriage 18. The movement may be read off visually or, better still, automatically as will be seen further on.

The endmost part of mobile carriage 18, opposite that which is supported by the fixed carriage 17, forms a fork having two arms 22 and 23 for straddling the workpiece P whose diameter is to be measured. The spacing between and the length of arms 22 and 23 will obviously be chosen depending on the maximum diameter to be measured (indicated with a dash-dot line in FIG. 2).

Arm 22 is provided with means for creating a narrow parallel light beam directed towards the other arm and perpendicular to the direction of movement of the mobile carriage 18 on the fixed carriage 17. The means shown comprise a light source 24, a condenser 25 and a reflecting mirror 26, placed inside arm 22. It can be seen that the light beam 27 leaving arm 22 will be intercepted or not by workpiece P depending on the position of the carriage. Arm 23 supports, for its part, means for receiving and reflecting beam 27. These means comprise a first mirror 28, a lens 29a for forming the image of a generatrix of the workpiece on an appropriate light-receiving surface. That surface is typically a screen. Mirrors 30 and 31 are provided so that the optical path between mirror 28 and screen 29 corresponds to the focal length of the lens. This screen 29 is in its turn coupled to a photosensitive member capable of supplying a signal when the image of the generatrix of the workpiece passes. A photomultiplier 32 may, in particular, be used connected to the central point of screen 29 by an optical fiber 33. In response to the passage of the generatrix, the photomultiplier supplies a voltage variation sufficient for it to be possible to take solely the light signal at the center of the screen and so to achieve high accuracy. This photo-electronic part of the device may be very similar to that described in U.S. Pat. No. 3,778,167 assigned to the assignee of the present application, the content of which is included by reference.

The operation of the device is clear from the preceding description and so will only be briefly discussed.

When it is desired to measure the diameter of workpiece P (FIG. 2), the carriages are first of all moved longitudinally along rod 15, which frees them from stop 16. Then the fixed carriage is placed on stop 34 which it maintains in a horizontal position. Then the mobile carriage is gradually moved forwards. At the moment when light beam 27 is obstructed due to the left hand generatrix of workpiece P moving through it, the electric current supplied by the photomultiplier 32 decreases abruptly. An electronic circuit (not shown) receiving the electric output from the photomultiplier tube 32 supplies a short pulse in response to the variation of light and initiates operation of the sensing apparatus 25a which counts the number of graduations of rule 24a which it scans as the carriage 18 is further moved to the right. When the extent of movement of carriage 18 reaches such an amplitude that light beam 27 is no longer occulted, i.e., when the right hand generatrix passes through the beam, the electronic circuit associated with the photomultiplier tube 32 supplies a second pulse which stops counting of the graduations of rule 24a by the sensing apparatus. The total count is stored and may be displayed on a display unit 35.

Carriage 18 may be moved in relation to the fixed carriage 17 and to rod 15 which forms a stationary support either manually or automatically by a motor. In the latter, if a step motor is used, the rule 24a and sensor 25a may often be omitted and replaced with a counter whose content is incremented by one bit at each advance step of the motor from the moment when the beam is occulted to the moment when it is again established.

It is apparent that the diameter of a workpiece P, or, more generally, the transversal dimension of a workpiece P in the direction of movement of the carriage, may be measured without contact and without the need for a return movement i.e., the complete measurement process is carried out in a single operation with movement in a single direction.

The device may be completed to allow it to make inner diameter measurements. Such a measurement may be required particularly on an inner machined workpiece held between mandrel chucks. It is then sufficient to provide the above described device with an adapter, for example of the kind shown in FIGS. 4 and 5. In these latter figures, the elements already shown in FIGS. 1 to 3 are shown with the same reference numbers and only the fork of the mobile carriage is represented.

The adapter comprises a slanting arm 36 rigidly fixed to the bottom 38 of the fork of the mobile carriage. Any securing method may be used. It may for example be formed by screws 39 which are engaged in nuts to lock a dovetail slide. The free end of the arm 36 supports a pin 41 situated approximately in the plane passing through the axis of the optical beam 27 and perpendicular to the direction of movement of the carriage. A balance bar 42 rotates about this arm and supports, at one end, a surface feeler such as a roller 43. The other end of the arm forms a flap 44 capable of occulting the light beam 27. The two arms will in general be of the same length, so as to supply a direct reading. However, the arms of the balance bar 42 may have unequal lengths, for example for measuring diameters situated at great depths.

The operation of the device provided with the adapter is similar to that which has just been described, except that a movement must be made successively in one direction, than in the other, and the measurement taken must be corrected by addition of a quantity corresponding to the diameter of roller 43, this quantity being determined by measurement on a standard ring.

It is apparent that within the scope of the invention, modifications and different arrangements can be made other than is here disclosed.

I claim:

1. A device for measuring an internal dimension of a hollow body, comprising:

support means for supporting said body;

a single carriage movable toward and away from the location of said body on said support means, said carriage being provided with a rigid fork of sufficient width and length to straddle said body to be measured;

light-emitting means carried by one arm of said fork for directing a light beam toward the other arm of said fork and transversely to the direction of movement of said carriage;

light-receiving means carried by the other arm of said fork and located to receive said light beam and to provide an image thereof;

adapting means having a balance beam rotatably mounted about a pin fast with said fork, one arm of said balance beam supporting a feeler for contact with said body and the other arm of said balance beam forming a flap for occulting said light beam;

means connected to said light-receiving means to deliver signals in response to the interruption of said light beam by said balance beam occulting, and in response to the subsequent reestablishment, of said light beam; and means for receiving said signals and for measuring the extent of movement of said carriage with respect to said support between said interruption and said reestablishment of said light beam upon continued movement of said carriage.

2. A device according to claim 1 wherein said light-receiving means comprises a screen coupled by optical fibers to a light transducer.

3. A device for measuring the diameter of a work piece on a lathe comprising:

a spindle mounted on the frame of said lathe for receiving said work piece;

a single carriage movable toward and away from the axis of said spindle and provided with a rigid fork of sufficient width and length to straddle said body to be measured;

a second carriage supporting said single carriage for movement of said single carriage toward and away from said said spindle axis, said second carriage being mounted for rotational movement around a rod fixed to said support means and extending perpendicularly to the direction of movement of said single movable carriage;

light-emitting means carried by one arm of said fork for directing a light beam toward the other arm of said fork transversely to the direction of movement of said single movable carriage;

light-receiving means carried by said other arm of said fork and located to receive said light beam and to provide an image thereof;

means connected to said light-receiving means to deliver signals in response to the interruption of said light beam by said body and to the subsequent reestablishment of said light beam; and means for receiving said signals and for measuring the extent of movement of said movable carriage between said interruption and said reestablishment of said light beam upon continued movement of said carriage, said receiving and measuring means comprising a graduated rule secured to said second carriage, and a sensing apparatus carried by a said movable carriage and cooperating with said graduated rule to count the number of graduations of said rule during the movement of said movable carriage between said interruption and said reestablishment of said light beam.

4. A device for measuring a dimension of a body, comprising;

support means for supporting said body;

a single carriage movable toward and away from the location of said body on said support means, and provided with a rigid fork of sufficient width and length to straddle said body;

a second carriage supporting said single movable carriage, said second carriage being mounted for rotational movement around a rod fixed to said support means and extending perpendicularly to the direction of movement of said single movable carriage;

light-emitting means carried by one arm of said fork for directing a light beam toward the other arm of said fork transversely to the direction of movement of said single movable carriage;

light-receiving means carried by said other arm and located to receive said light beam and provide an image thereof;

means connected to said light-receiving means and arranged to deliver signals in response to the interruption and reestablishment of the light path by said body; and means for receiving said signals and for measuring the extent of movement of said movable carriage with respect to said location of said body between the interruption and reestablishment of said light beam upon continued movement of said carriage.

5. A device according to claim 4, wherein the light-receiving means comprises a screen coupled by optical fibers to a light sensor.

6. A device according to claim 4, wherein said light-emitting means delivers a light beam perpendicular to said direction of movement.

7. A device according to claim 5, wherein said light sensor is a photomultiplier tube.

8. A device according to claim 4 for measuring the diameter of a workpiece on a lathe, wherein said support means is the frame of the lathe, on which is mounted a spindle or mandrel and said movable carriage is movable toward and away from the axis of the spindle or the mandrel.

9. A device according to claim 8, wherein said movable carriage is slidably supported by said second carriage mounted for longitudinal movement.

10. A device according to claim 9, wherein said rod is parallel to said spindle.

* * * * *